United States Patent
Fuxa et al.

(10) Patent No.: US 8,444,402 B2
(45) Date of Patent: May 21, 2013

(54) AUTOMATIC CONCENTRIC CRANK-SIDE COMPRESSOR VALVE

(75) Inventors: Uwe Fuxa, Vienna (AT); Gunther Machu, Vienna (AT); Markus Testori, Hollabrunn (AT)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 211 days.

(21) Appl. No.: 12/662,499

(22) Filed: Apr. 20, 2010

(65) Prior Publication Data
US 2010/0269927 A1    Oct. 28, 2010

(30) Foreign Application Priority Data
Apr. 23, 2009 (AT) ........................... 623/2009

(51) Int. Cl.
*F04B 39/10* (2006.01)
*F04B 53/10* (2006.01)

(52) U.S. Cl.
USPC .......... 417/567; 417/570; 137/516.13

(58) Field of Classification Search
USPC .......... 417/458, 459, 548, 551, 553, 570, 417/567; 92/181 R, 181 P; 91/422, 222–229; 137/512, 516.11, 516.13, 516.15
See application file for complete search history.

(56) References Cited

U.S. PATENT DOCUMENTS

| | | | | |
|---|---|---|---|---|
| 497,092 A | * | 5/1893 | Davis | 92/110 |
| 729,284 A | * | 5/1903 | Daniels | 277/533 |
| 1,339,311 A | * | 5/1920 | Zwicky | 417/534 |
| 1,938,218 A | * | 12/1933 | Dempsey, Jr. | 417/550 |
| 2,006,583 A | * | 7/1935 | Dennison | 92/160 |
| 2,339,848 A | * | 1/1944 | Feeney | 123/62 |
| 2,523,376 A | * | 9/1950 | Kalitinsky | 417/571 |
| 2,834,298 A | * | 5/1958 | Wright et al. | 210/416.4 |
| 3,292,848 A | | 12/1966 | Kehler | |
| 3,309,013 A | | 3/1967 | Bauer | |
| 3,491,654 A | | 1/1970 | Zurcher | |
| 3,814,546 A | * | 6/1974 | Ostwald | 417/298 |
| 3,829,253 A | * | 8/1974 | Bunn et al. | 417/504 |
| 3,920,356 A | * | 11/1975 | Bruggeman | 417/511 |
| 5,011,383 A | * | 4/1991 | Bennitt | 417/534 |
| 5,378,117 A | * | 1/1995 | Bennitt | 417/298 |
| 5,658,134 A | * | 8/1997 | Gagnon et al. | 417/262 |

FOREIGN PATENT DOCUMENTS

DE    1199566    *    8/1965
GB    249763         4/1926

OTHER PUBLICATIONS

English Abstract of WO 98/04853.

* cited by examiner

*Primary Examiner* — Devon Kramer
*Assistant Examiner* — Thomas Fink
(74) *Attorney, Agent, or Firm* — Dykema Gossett PLLC

(57) ABSTRACT

To reduce the clearance volume for a crank-side concentric suction and pressure valve, it is proposed to arrange a sealing 20 axially abutting on the suction and pressure valve 2,3, wherein the sealing 20 consists of a number of pressure packings 21*a*, 21 which are arranged axially one behind the other.

7 Claims, 3 Drawing Sheets

AUTOMATIC CONCENTRIC CRANK-SIDE COMPRESSOR VALVE

BACKGROUND OF THE INVENTION

1. Field of the Invention

The present application relates to an automatic compressor valve with a suction valve and a pressure valve which are arranged concentrically to one another, wherein the suction valve and the pressure valve are arranged radially adjacent to one another and the suction valve and the pressure valve are formed from a first and a second valve disk between which for each suction valve and each pressure valve, one sealing element is movably arranged, and to the use of the compressor valve in a compressor.

2. The Prior Art

It is known for piston compressors to provide on the cylinder head side a suction valve and a pressure valve concentrically arranged in one plane. Such an arrangement is known, e.g. from DE 1 503 422. Since no separate suction and pressure valves are necessary which require considerably more installation space when they are individual components, the clearance volume on the cylinder head side can be minimized to a large extent.

In double-acting piston compressors, suction and pressure valves must also be provided on the crankcase side. However, since the reciprocating piston rod has also to be guided through on the crankcase side, the arrangement of suction and pressure valves is considerably more complex and difficult, in particular in a desired small clearance volume. Naturally, the suction and pressure valves can also be arranged on the cylinder wall, which, however, results in a larger clearance volume. Alternatively, a concentric suction and pressure valve can be arranged on the crankcase side, as it is known, e.g. from GB 249 763 B. In this valve, the suction valve and the pressure valve are arranged axially one behind the other which, on the one hand, causes a great overall length of the valves, but also of the cylinder itself and, on the other hand, results in a large clearance volume. Moreover, this arrangement causes that the cylinder becomes more complex and complicated due to necessary flow channels. In addition, the pressure valve on the crank side is surrounded by a seal for sealing against the piston rod around which hot compressed pressure medium flows. Thus, besides the occurring frictional heat, the seal is additionally heated up in an unfavorable manner by the pressure medium.

Moreover, this arrangement requires a very complex and hence costly valve and cylinder construction.

Therefore, it is an object of the present invention to provide an automatic suction and pressure valve which is to be arranged on the crank side and which allows a crank-side assembly in a cylinder with a clearance volume as small as possible, and which is structured in a simple and compact manner.

SUMMARY OF THE INVENTION

This object is solved according to the invention in that in the first and in the second valve disk, an axially continuously open recess is provided and that a sealing consisting of a number of pressure packings, which are arranged axially one behind the other, is arranged axially abutting on the second valve disk. During operation, the piston rod is guided through the recess, wherein the circumferential gap generated thereby between piston rod and recess represents an undesired clearance volume. Since the distance between recess and piston rod can not be reduced at will, in particular because the piston rod is also subject to movements transverse to the stroke movement, the circumferential gap (and thus the clearance volume) is reduced in that the axial length of the circumferential gap is reduced by the arrangement of the seal (which borders the circumferential gap in axial direction) axially resting on the second valve disk. By means of this design of a suction and pressure valve with directly attached seal, the clearance volume can be reduced accordingly.

The axial length of the circumferential gap and thus the clearance volume can be further reduced if at least one pressure packing is arranged in the second valve disk.

It is particularly advantageous if the suction valve is arranged radially on the inside and a supply chamber for supplying a pressure medium to the suction valve is bordered radially on the inside by the seal. In this case, the seal is surrounded by a flow of supplied cold pressure medium and is cooled at the same time. Thereby, the service life of the seal can be increased or the seal is exposed to lower thermal requirements and thus can be designed in a simpler and more inexpensive (e.g. with respect to the used materials) manner.

BRIEF DESCRIPTION OF THE DRAWINGS

The present invention is described hereinafter based on the FIGS. 1 to 3 which show schematic, exemplary, non-limiting and advantageous embodiments. In the figures.

DETAILED DESCRIPTION OF THE PREFERRED EMBODIMENT

Figure 1:
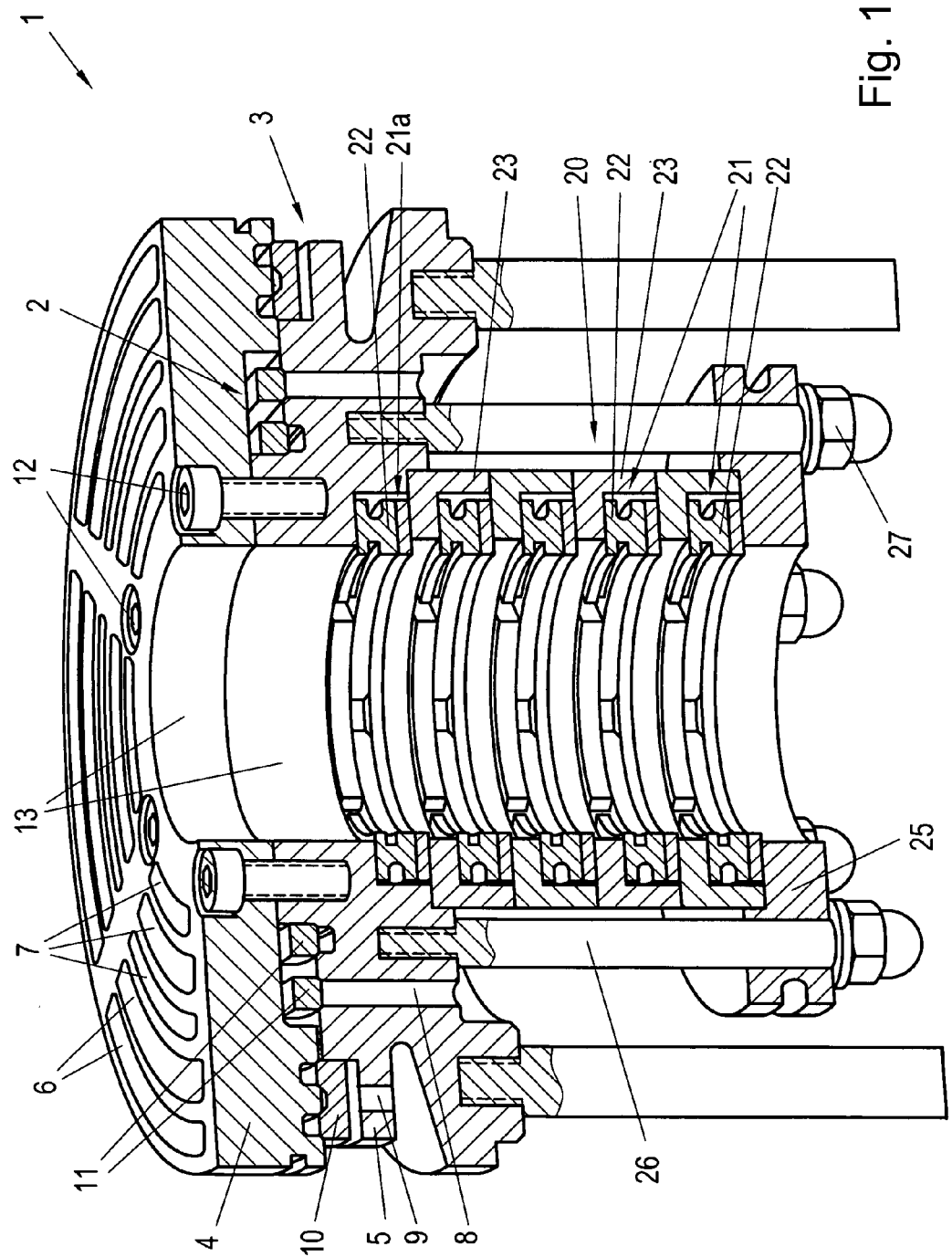
FIG. 1 shows a perspective view of a section through a compressor valve according to the invention.

In FIG. 1, a compressor valve 1 according to the invention with a suction valve 2 and a pressure valve 3 arranged concentrically to one another, and with a sealing 20 is illustrated. The suction valve 2 and pressure valve 3 are formed by a first valve disk 4 facing the cylinder space Z and a second valve disk 5 facing the crankcase space K, wherein the valve disks are arranged axially abutting against one another. Here, the valve disks 4, 5 are connected with one another by screws 12 distributed over the circumference; however, it is obvious that they can also be connected by means of a different suitable connection. For the pressure valve 3, the first valve disk 4 is the valve seat and the second valve disk 5 is the valve stop. For the suction valve 2, the arrangement is reversed, thus, the first valve disk 4 is the valve stop and the second valve disk 5 is the valve seat. In the shown example, the pressure valve 3 is arranged radially on the outside and the suction valve 2 is arranged radially on the inside (however, this can also be reversed), and the suction valve 2 and the pressure valve 3 are therefore not arranged axially next to one another "but are arranged substantially in one plane or radially next to one another." Within the valve disks 4, 5, a plurality of through-flow channels 6, 7, 8, 9 are arranged in a manner known per se to supply or discharge pressure medium. Between the first and the second valve disk 4, 5 (or between the respective valve seat and valve stop), for each of the suction valve 2 and the pressure valve 3, a sealing element 11, 10 is provided which is arranged movably in axial direction. Also, a sealing element 10, 11 can be pushed in a manner known per se against the respective valve seat by means of spring elements such as, e.g., spiral springs which are arranged in the respective valve stop, or by means of spring plates between the valve stop and the sealing element.

Here, the sealing elements 10, 11 are designed as sealing plates which, in a manner known per se, have a plurality of through-flow channels. Each of the sealing elements 10, 11 are guided here radially on the inside on an axial step of the second valve disk 5. Alternatively, a sealing element 10, 11 can also be designed in the form of individual concentric sealing rings. Also, the radial and axial guide of the sealing elements 10, 11 can be shaped differently, e.g. by means of guide lugs on the valve seat.

The sealing elements 10, 11 can have a planar sealing surface (thus lying in a plane orthogonal to the axis of the compressor valve 1). However, the sealing elements 10, 11 can also have a profiled sealing face such as, e.g., beveled edges, toroidal-shaped sealing faces, or other arbitrarily formed sealing faces. The associated sealing faces on the respective valve seat are formed in a diametrically opposing manner.

Figure 2:
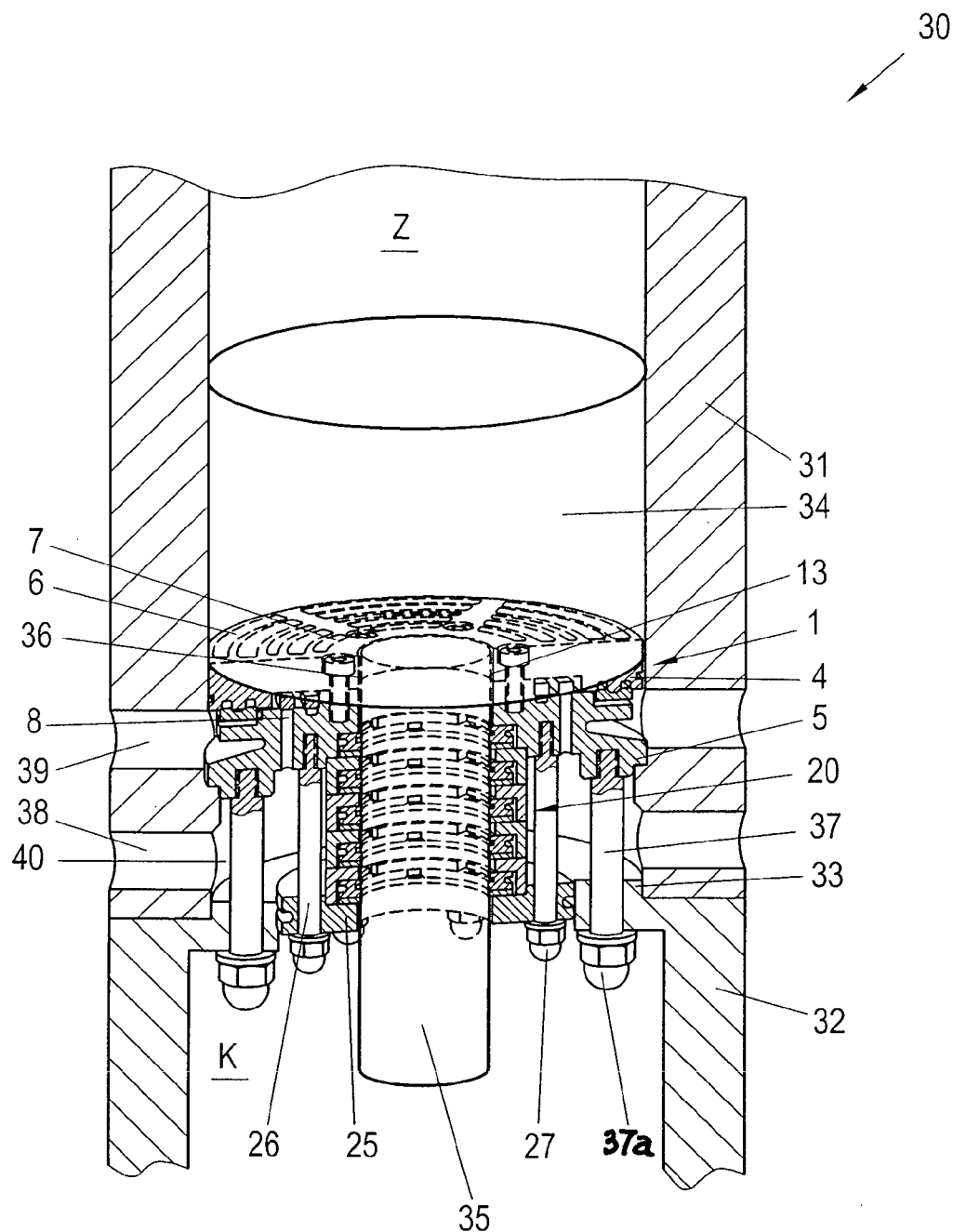
FIGS. 2 and 3 show a view of the use of a valve according to the invention in a cylinder of a compressor.

Radially on the inside on each of the valve disks 4, 5, an axially continuously open recess 13 is. provided through which during the operation of the valve, a piston rod 35 is guided through (see FIG. 2). To avoid contact and thus wear and generation of friction or friction heat between piston rod 35 and recess 13, the recess 13 should be spaced apart from the outer circumferential surface of the piston rod 35. However, this generates a circumferential gap 36 between piston rod 35 and recess 13, the volume of the gap forming a clearance volume. Therefore, it is aimed to keep the circumferential gap 36 as small as possible. The radial distance to the piston rod 35, however, can not be made as small as possible because the piston rod 35 is also subject to radial movements (transverse to the stroke movement).

To minimize the circumferential gap 36, according to the invention, the piston rod's sealing assembly 20 against the crankcase is arranged axially adjacent to the compressor valve's second valve disk 5 facing the crankcase space K to keep the axial length of the circumferential gap 36 as small as possible. The sealing assembly 20 typically comprises a plurality of pressure packings 21 which are arranged axially one behind the other and which, e.g., consist in a manner known per se of radially and/or tangentially cut or segmented package rings 22, possibly in combination with support rings which are arranged in a chamber disk 23. On a front face or on both sides, the sealing assembly 20 could also have an axial closure, e.g., in the form of a ring-shaped disk. Such sealing assemblies 20 of a piston rod 35 are well known and they will not be further described hereinafter.

Preferably, the sealing assembly 20 is arranged as close as possible to the compressor valve's 1 axial end on the cylinder side because thereby, the radial length of the circumferential gap 36 is further reduced. For this it is provided to arrange at least a first pressure packing 21a in the second valve disk 5. It is also conceivable to arrange further pressure packings 21 in the second valve disk 5. For these pressure packing(s) 21a, a chamber disk 23 can be omitted and the function of the same can be performed by the second valve disk 5. The closer the first pressure packing 21a is arranged to the compressor valve's 1 end on the cylinder side, the more the axial length of the circumferential gap 36 can be shortened and the smaller the clearance volume.

For fastening the sealing assembly 20 on the compressor valve 1, in the shown exemplary embodiment, a retainer plate 25 is provided through which bolts 26 extend which are distributed over the circumference and which are screwed into the second valve disk 5. The retainer plate 25 is pressed against the sealing assembly 20 by means of nuts 27, whereby the sealing is fastened to the compressor valve 1. Thus, the compressor valve 1 can be completely pre-assembled and can subsequently be inserted as one single component into the cylinder, which simplifies the assembly considerably. Moreover, an assembly of the sealing assembly 20 at a later time or an easy maintainability of the sealing assembly 20 is achieved.

Figure 3:
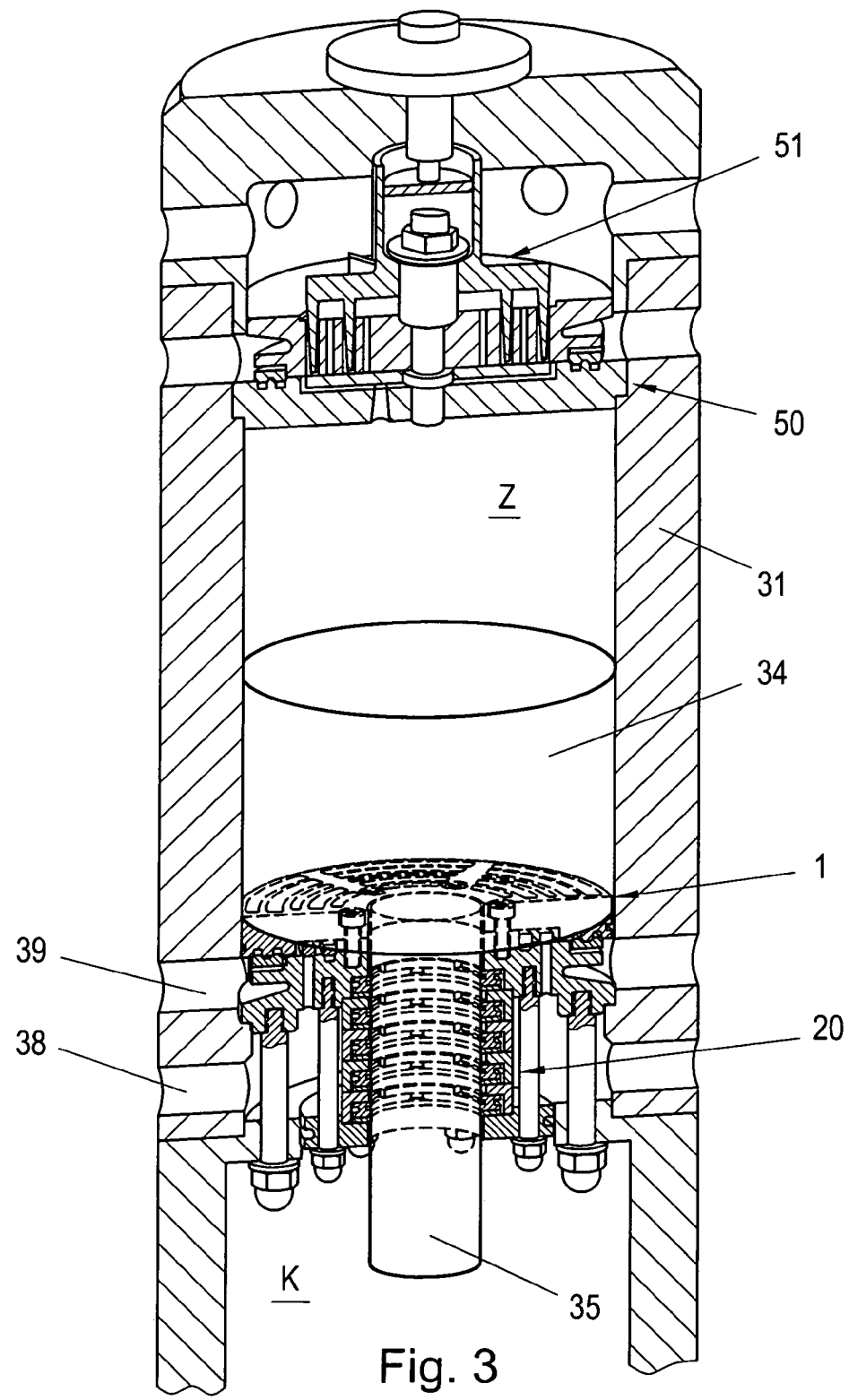

FIGS. 2 and 3 show the compressor valve 1 according to the invention during operation in a cylinder 31 of a double-acting compressor 30. In a cylinder 31 of the compressor 30, a piston 34, which is connected with a piston rod 35, is moved in a reciprocating manner. The cylinder 31 could also be designed as a cylinder liner. The crankcase 32 is separated from the cylinder 31 by a separating wall 33. Here, the compressor valve 1 according to the invention is mounted on the separating wall 33. For this purpose, a number of bolts 37 distributed over the circumference extend through the separating wall 33, which bolts are screwed into the compressor valve 1, here, into the valve disk 5. The compressor valve 1 can be fastened to the separating wall 33 by means of nuts 37a. For this, the retainer plate 25 can also be arranged in a recess of the separating plate 33, wherein a suitable sealing element, e.g., an O-ring, can be provided at the retainer plate 25 to seal against the separating plate 33.

The piston rod 35 is guided through the recesses 13 of the compressor valve 1. The sealing 20 surrounds the piston rod 35 and seals the cylinder space Z against the crankcase space K.

In the wall of the cylinder 31, supply openings 38 are provided through which pressure medium, e.g. air, is supplied to the suction valve 2. The supplied pressure medium is guided here between the second valve disk 5 and the separating wall 33, wherein the supply chamber 40 formed thereby is bordered radially on the inside by the sealing 20. Furthermore, discharge openings 39 are provided in the wall of the cylinder 31 through which discharge openings the compressed pressure medium flowing out of the pressure valve 3 is discharged. Preferably, a plurality of supply openings 38 and/or discharge openings 39 is provided over the circumference.

Due to the fact that the supply chamber 40 is bordered radially on the inside by the sealing assembly 20, the cold supplied pressure medium flows around the sealing assembly 20 and cools the sealing assembly 20 at the same time. Thereby, the service life of the sealing assembly 20 can be increased or the sealing 20 is subject of a lower thermal requirement and can thus be designed in a simpler and more favorable manner.

The clearance volume between piston 34 and the first valve disk 4 can be minimized to a large extent by adapting the piston 34 to the shape of the first valve disk's 4 axial front face which faces the cylinder space Z and which preferably has a planar shape. Thereby, the distance between the first valve disk 4 and the piston 34 can be reduced so far that no contact between piston 34 and compressor valve 1 takes place during operation.

Here too, a concentric suction and pressure valve 50 is arranged on the cylinder head side, which valve can be controlled by means of an unloader 51. An unloader can also be arranged on the compressor valve 1 on the crank side, e.g. laterally projecting through the cylinder 31 or from underneath and through the crankcase space K.

The compressor valve 1 according to the invention can, of course, also be used in a single-acting compressor in which case the compressor valve 1 according to the invention would be the only valve on the cylinder.

The invention claimed is:

1. An automatic compressor valve which comprises:
a first valve disk with a first radially central axial recess and a second valve disk with a second radially central axial recess,
first and second sealing elements movably positioned between said first and second valve disks, said first and second valve disks and said first sealing element forming a suction valve and said first and second valve disks and said second sealing element forming a pressure valve, said suction valve and said pressure valve being arranged concentrically and radially adjacent to one another,
a sealing assembly with a third radially central axial recess and comprising a plurality of pressure packings which are arranged axially one behind the other, wherein said sealing assembly is arranged axially abutting on the second valve disk, and
wherein the first, second and third axial recesses are arranged axially adjacent one another and extend through the valve and provide a passageway for a piston rod extending through the valve.

2. The automatic compressor valve according to claim 1, wherein the suction valve is arranged radially within the pressure valve, and including an outer cylinder which encloses a supply chamber for supplying pressure medium to the suction valve, said suction valve being bordered radially inwardly by the sealing assembly.

3. A compressor with a cylinder and a crankcase, wherein the crankcase is separated from the cylinder by a separating wall, and an automatic compressor valve according to claim 1 is arranged on the separating wall, and a piston rod of the compressor is guided through the radially central, axial recesses of the first and second valve disks and the radially center recess of the sealing assembly for sealing between a cylinder space and the crankcase.

4. The compressor according to claim 3, wherein the wall of the cylinder includes a plurality of supply openings for supplying pressure medium and/or a plurality of discharge openings for discharging pressure medium.

5. The automatic compressor valve according to claim 1, wherein the first and second valve disks axially abut each other.

6. The automatic compressor valve according to claim 1, wherein:
each of said first and second valve disks provide flow-through channels there through, wherein said first valve disk defines a chamber opening to flow-through channels in said second valve disk, and wherein said second valve disk defines a chamber opening to flow-through channels in said first valve disk, said first and second sealing elements being respectively movably positioned in said chambers for closing respective flow-channels of said first and second valve disks.

7. The automatic compressor valve according to claim 1, wherein at least one of said plurality of pressure packings is located within said second valve disk.

* * * * *